United States Patent
Weldon

(10) Patent No.: US 9,010,714 B2
(45) Date of Patent: Apr. 21, 2015

(54) APPARATUS FOR SUPPORTING AN ELECTRONIC DEVICE

(71) Applicant: Peter Marvin Weldon, Sebring, FL (US)

(72) Inventor: Peter Marvin Weldon, Sebring, FL (US)

(*) Notice: Subject to any disclaimer, the term of this patent is extended or adjusted under 35 U.S.C. 154(b) by 81 days.

(21) Appl. No.: 13/897,255

(22) Filed: May 17, 2013

(65) Prior Publication Data

US 2014/0339381 A1 Nov. 20, 2014

(51) Int. Cl.
| | |
|---|---|
| A47K 3/00 | (2006.01) |
| F16M 13/02 | (2006.01) |
| F16M 11/04 | (2006.01) |
| F16M 11/26 | (2006.01) |
| F16M 13/00 | (2006.01) |

(52) U.S. Cl.
CPC .............. *F16M 13/022* (2013.01); *A47K 3/001* (2013.01); *F16M 11/041* (2013.01); *F16M 11/26* (2013.01); *F16M 13/00* (2013.01); *A47K 3/004* (2013.01)

(58) Field of Classification Search
CPC ................. A47B 23/00; A47B 23/043; A47B 2023/008; A47K 3/004; A47K 3/001; F16M 13/022; F16M 13/00; F16M 11/26; F16M 11/041
USPC ........ 248/126, 441.1, 444.1, 447.1, 448, 453, 248/451; D6/525; 211/42, 43, 119.009, 211/119.006; 108/44, 49; 4/559
See application file for complete search history.

(56) References Cited

U.S. PATENT DOCUMENTS

| | | | | |
|---|---|---|---|---|
| 642,168 | A | * | 1/1900 | Smith ................................ 4/579 |
| 1,830,347 | A | * | 11/1931 | Camden et al. ................ 108/137 |
| 2,006,169 | A | | 5/1934 | Harris-Jones |
| 2,468,412 | A | * | 4/1949 | Schaefer ........................ 108/149 |
| 3,239,850 | A | | 3/1966 | Kiss |
| 3,475,052 | A | * | 10/1969 | Kaposi ........................... 297/153 |
| 3,664,629 | A | * | 5/1972 | Reed ................................ 48/445 |
| 3,809,352 | A | | 5/1974 | Mathias |
| 3,950,793 | A | | 4/1976 | Adams |
| D250,439 | S | | 12/1978 | Holstein |
| 4,199,125 | A | * | 4/1980 | Simon ......................... 248/447.2 |
| 4,811,875 | A | * | 3/1989 | DiSimone ..................... 224/541 |
| 5,669,313 | A | | 9/1997 | Cottingham |
| 5,761,753 | A | | 6/1998 | Talbert |
| 5,765,799 | A | * | 6/1998 | Weber .......................... 248/453 |
| D417,809 | S | | 12/1999 | Hofman |
| 6,058,522 | A | | 5/2000 | Thakar |
| D448,225 | S | | 9/2001 | Wright |
| 6,454,106 | B1 | * | 9/2002 | Howard ........................... 211/50 |
| 6,520,092 | B2 | * | 2/2003 | Marshall et al. ................ 108/44 |
| 7,118,080 | B2 | * | 10/2006 | Chan et al. ..................... 248/129 |
| D558,475 | S | * | 1/2008 | Rubio ............................ D6/355 |
| 7,559,522 | B1 | * | 7/2009 | Hlatky ........................ 248/441.1 |

* cited by examiner

*Primary Examiner* — Anita M King
(74) *Attorney, Agent, or Firm* — Lonnie R Drayer

(57) ABSTRACT

An apparatus for supporting an electronic device includes a primary support member. Secondary support components at each end of the primary support member may rest upon spaced apart parallel upper surfaces of a device such as a bath tub. An assembly for receiving an electronic device is mounted on the primary support member. An electronic device such as an e-reader or a tablet computer is supported and protected by the apparatus. A transparent front panel extends upwardly in front of the electronic device but does not cover the entire touch screen of the electronic device to allow access to a top portion of the touch screen to turn pages of a displayed file. The transparent front panel may be hinged to pivot to a horizontal orientation to support a keyboard and allow access to the entire screen of the electronic device.

18 Claims, 16 Drawing Sheets

APPARATUS FOR SUPPORTING AN ELECTRONIC DEVICE

FIELD OF THE INVENTION

The present invention relates to an apparatus for supporting an electronic device, such as a small lap top computer, tablet, e-reader or smart phone, for use by a person in a bath tub, whirlpool, hospital bed, wheel chair, or recliner (Geri-chair).

BACKGROUND OF THE INVENTION

People now have opportunity to read and write via electronic devices compared to the more and more antiquated ways of hard copies involving paper. Some people have enjoyed reading while relaxing in a bath tub filled with hot water. However, the use of electronic devices such as e-readers in locations where the device may be exposed to moisture can lead to undesirable consequences because many electronic devices are not waterproof. A person may wish to use an electronic device such as an e-reader, tablet, smart phone or laptop computer in an environment where holding the electronic device for an extended time may be inconvenient or impractical such as in a wheelchair or hospital bed. An apparatus to help people who want to use an electronic device in these types of situations would be very beneficial and at least reduce the potential of damaging an electronic device by dropping the device or exposure of the device to steam or immersion in liquid. There is disclosed herein an apparatus for supporting, holding, and protecting electronic devices while lounging in a tub bath, whirlpool, hospital bed, wheel chair, recliner or other settings.

DISCUSSION OF THE PRIOR ART

U.S. Pat. No. 2,006,169A discloses a book rest for bath tubs having supporting members that are metal rods configured to serve as suitable support for engaging the top edges of a bath tub. The width of the device is adjusted by sliding the support members in tubular fixtures on the sides of a tray. A foldable rack is provided to support a book, mirror or the like. The support members are curved to compliment the contour of a bath tub.

U.S. Pat. No. 3,239,850A discloses a book rest and vanity for bath tubs having supports that may be adapted to bath tubs of various widths. A pair of clips may hold a book or pamphlet in an open position for one to read while taking a bath.

U.S. Pat. No. 3,809,352A discloses a book holder and shield wherein the book holder has a pair of associated panels that are spaced apart to provide a channel in which an open book may be inserted such that pages of the book are visible through the transparent outermost panel which protects the exposed pages from contact by extraneous material.

U.S. Pat. No. 3,950,793A discloses a bath tub book stand. A horizontal support beam extends across a bath tub. A clamping jaw fixes the horizontal support beam to an outer rim of a bath tub. A book stand is attached to the support beam in an adjustable manner.

U.S. Pat. No. 4,199,125A discloses a water proof bath tub reading stand. A transparent waterproof container holds reading material and is provided with clips that are used to turn the pages without wetting them. The pages turning clip assembly turns the pages by being moved through an aperture in a transparent movable shield.

U.S. Pat. No. 5,669,313A discloses a tub table for supporting an open book on a bath tub. Two curved ridges extend downward from the bottom side positions of the tub table, with the ridges extending below the top rim of the tube to maintain the tub table on the tub when it is slid there along.

U.S. Pat. No. 5,761,753A discloses a bathing caddy having a main support bar with a telescoping support tube slidably and adjustably mounted therein. A book holder is supported by a ledger onto the main support bar. The main support bar is pivotally mounted on a clamping bracket that allows the main support bar to swing across the bath tub.

U.S. Pat. No. 6,058,522A discloses a bath tub tray having a panel pivotally coupled to a spaced apart pair of planks. The arm portions of a generally L-shaped support bar are pivotally coupled to the planks to support a portion of the panel above the planks.

U.S. Des. 250,439 discloses a bath tub tray provided with a book holder.

U.S. Des. 417,809 discloses a bath tub organizer provided with a book holder.

U.S. Des. 448,225 S discloses a bath tub caddy provided with a book holder.

SUMMARY OF THE INVENTION

There is provided in accordance with a first aspect of the invention an apparatus for supporting an electronic device that includes a primary support member having first and second end. Each end of the primary support member is fixed to a secondary support component that is configured to mate with an upper surface of a device for receiving a person. The device for receiving a person is provided with a pair of spaced apart at least substantially parallel upper surfaces. The apparatus further includes an assembly for receiving an electronic device wherein the assembly is mounted on the primary support member. The assembly includes a back panel extending upwardly from and fixed to the primary support member. A pair of at least substantially parallel side supports are fixed directly or indirectly to and extending upwardly from the primary support member. Each of the side supports defines at least in part a channel that faces and is parallel to the channel defined at least in part by the other side support for receiving an electronic device with a side of the electronic device resting on the primary support member. A transparent panel extends upwardly from and is fixed to the primary support member. The transparent panel extends upwardly from the primary support member a distance that is less than a distance that the back panel extends upwardly from the primary support member, the transparent panel being disposed with the side supports located between the transparent panel and the back panel.

There is provided in accordance with a second aspect of the invention an apparatus for supporting an electronic device that includes a primary support member having first and second end. A secondary support component is attached to each end of the primary support member and at least one of the secondary support components is movable with respect to the primary support member to adjust an overall length of the primary support assembly. Each of the secondary support components is configured to mate with an upper surface of a device for receiving a person wherein the device for receiving a person is provided with a pair of spaced apart at least substantially parallel upper surfaces. The apparatus is further provided with an assembly for receiving an electronic device wherein the assembly is mounted on the primary support member. The assembly for receiving an electronic device includes a back panel extending upwardly from and fixed to the primary support member. A pair of at least substantially parallel side supports are fixed to and extend upwardly from the primary support member, each of the side supports defining at least in part a channel that is open towards the channel defined at least in part by the other side support for receiving an electronic device when a side of the electronic device is resting on the primary support member. At least one of the side supports is movable with respect to the primary support member to accommodate electronic devices of various sizes. A transparent panel extends upwardly from and is fixed to the primary support member by at least one hinge The transparent panel extends upwardly from the primary support member a distance that is less than a distance that the back panel extends upwardly from the primary support member. The transparent panel is disposed with the side supports located between the transparent panel and the back panel.

There is provided in accordance with a third aspect of the invention an apparatus for supporting an electronic device that includes a primary support assembly comprising a primary support member having first and second ends, A secondary support component is attached to each end of the primary support member. Each of the secondary support components is movable with respect to the primary support member to adjust an overall length of the primary support assembly. Each of the secondary support components is configured to mate with an upper surface of a device for receiving a person wherein the device for receiving a person is provided with a pair of spaced apart at least substantially parallel upper surfaces. An assembly for receiving an electronic device is mounted on the primary support member. The assembly for receiving an electronic device includes a back panel extending upwardly from and fixed to the primary support member. A pair of at least substantially parallel side supports are fixed to and extend upwardly from the primary support member. Each of the side supports defines a channel that faces and is parallel to the channel defined by the other side support for receiving an electronic device when a side of the electronic device is resting on the primary support member. At least one of the side supports is movable with respect to the primary support member to accommodate electronic devices of various sizes. A transparent panel extends upwardly from and is fixed to the primary support member by at least one hinge. The transparent panel is disposed with the side supports located between the transparent panel and the back panel. The transparent panel extends upwardly from the primary support member a distance that is less than a distance that the back panel extends upwardly from the primary support member with a gap between an uppermost edge of the transparent panel and an uppermost edge of the back panel. The transparent panel is pivotable about the at least one hinge between a first orientation where the transparent panel extends upwardly from the primary support member to shield at least a portion of a display screen of an electronic device supported by the side supports and the primary support member, and a second orientation where the transparent panel is oriented at least substantially horizontal.

DETAILED DESCRIPTION OF THE INVENTION

A variety of views of an exemplary prototype of an apparatus 10 for supporting an electronic device are presented in FIGS. 1-8. It is to be understood that the prototype was fabricated using readily available materials and that commercially manufactured products in accordance with the present invention may have components that have different shapes and sizes and comprise materials selected in accordance with good engineering practices.

As used herein and in the claims terms indicating direction such as top, bottom, higher, lower, and so forth are understood to be interpreted with respect to an apparatus of the present invention when the apparatus is oriented in its utilitarian orientation as shown for example in FIGS. 1, 3, 9, 11 and 12. As used herein and in the claims the term "upwardly is understood to have its common meaning of "directed or moving towards a higher point or level" and upwardly does not simply mean a vertical direction so long as the element of the claimed invention extends toward a higher point or level even if at an inclination other than vertical.

Figure 1:
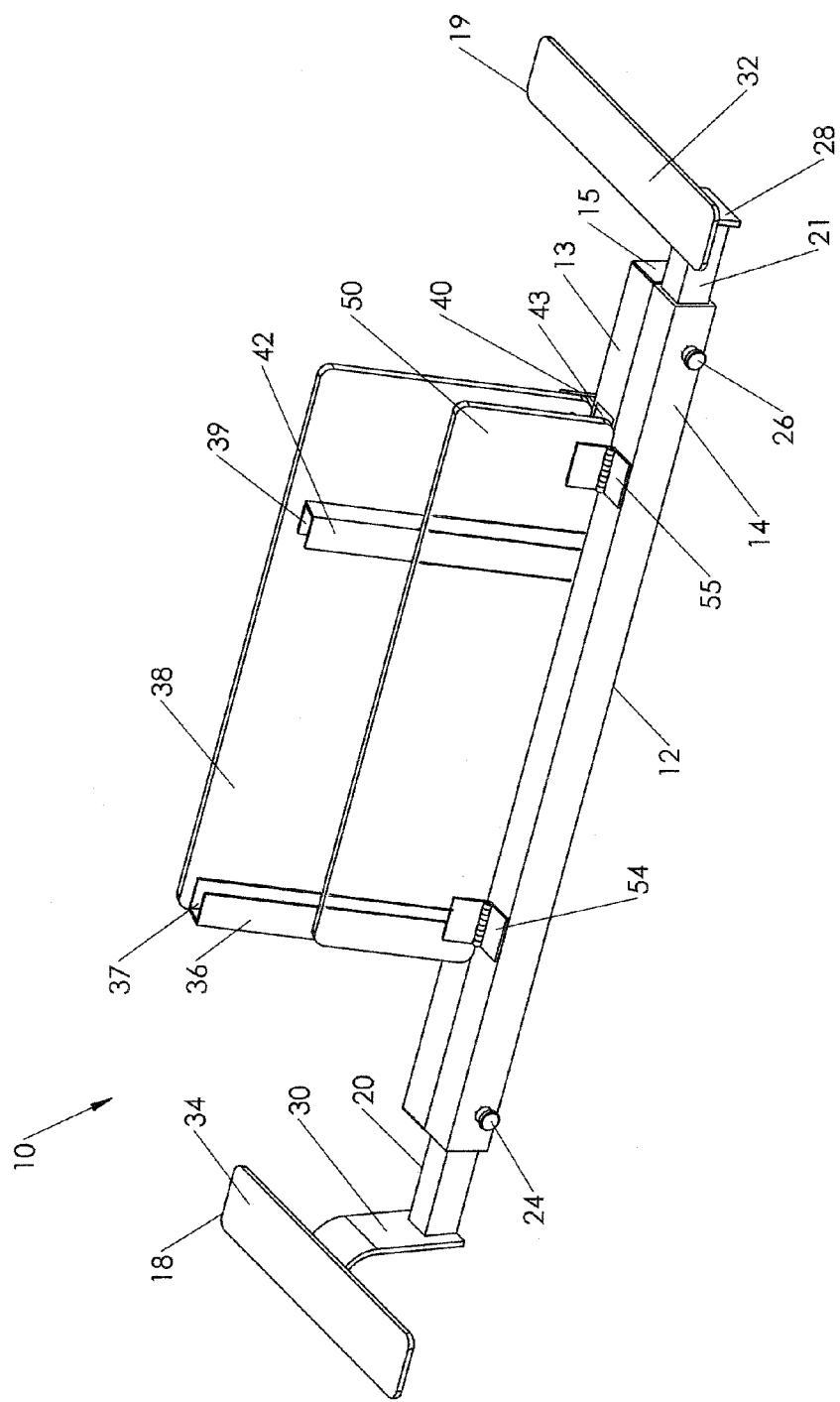
FIG. 1 is a front perspective view of an apparatus for supporting an electronic device.
Figure 2:
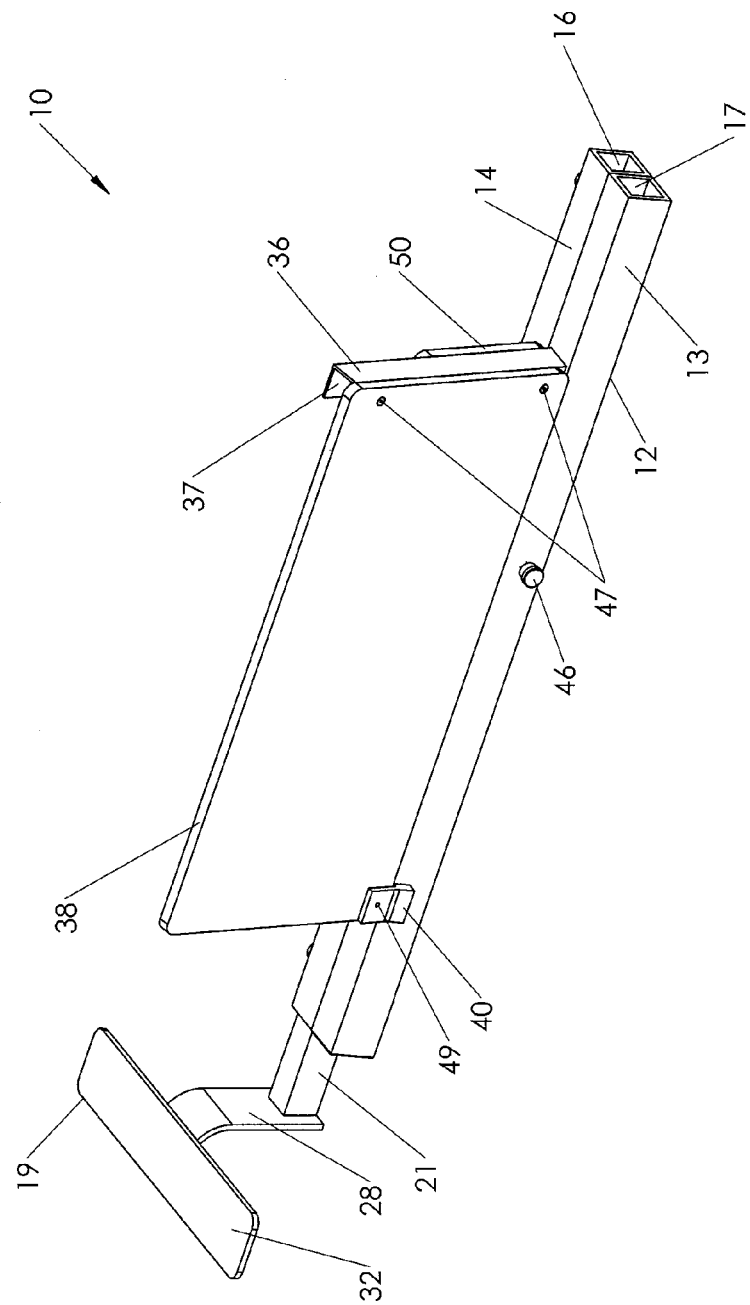
FIG. 2 is a rear perspective view of the apparatus of FIG. 1 with one of the adjustable support arms removed and the slidable device side support removed.
Figure 2A:
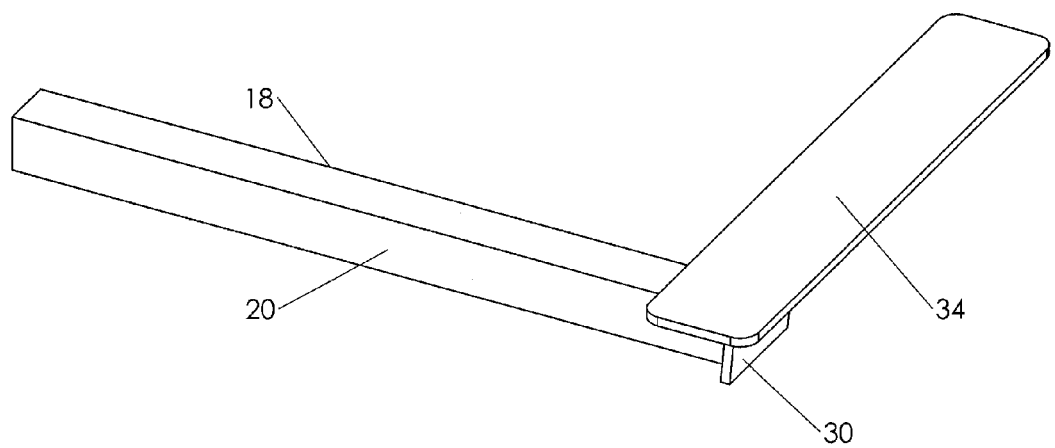
FIG. 2A shows the adjustable support arm that is removed from the apparatus in FIG. 2.
Figure 6:
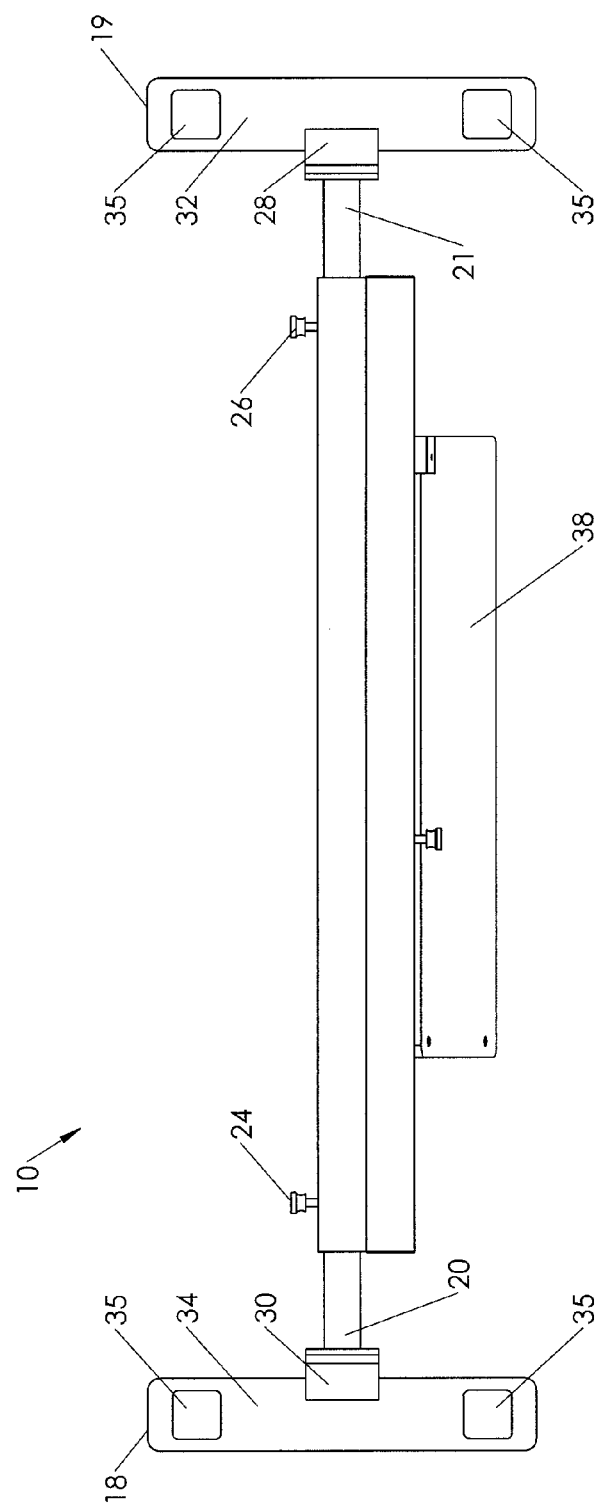
FIG. 6 is a bottom view looking up towards the apparatus of FIG. 1.
Figure 7:
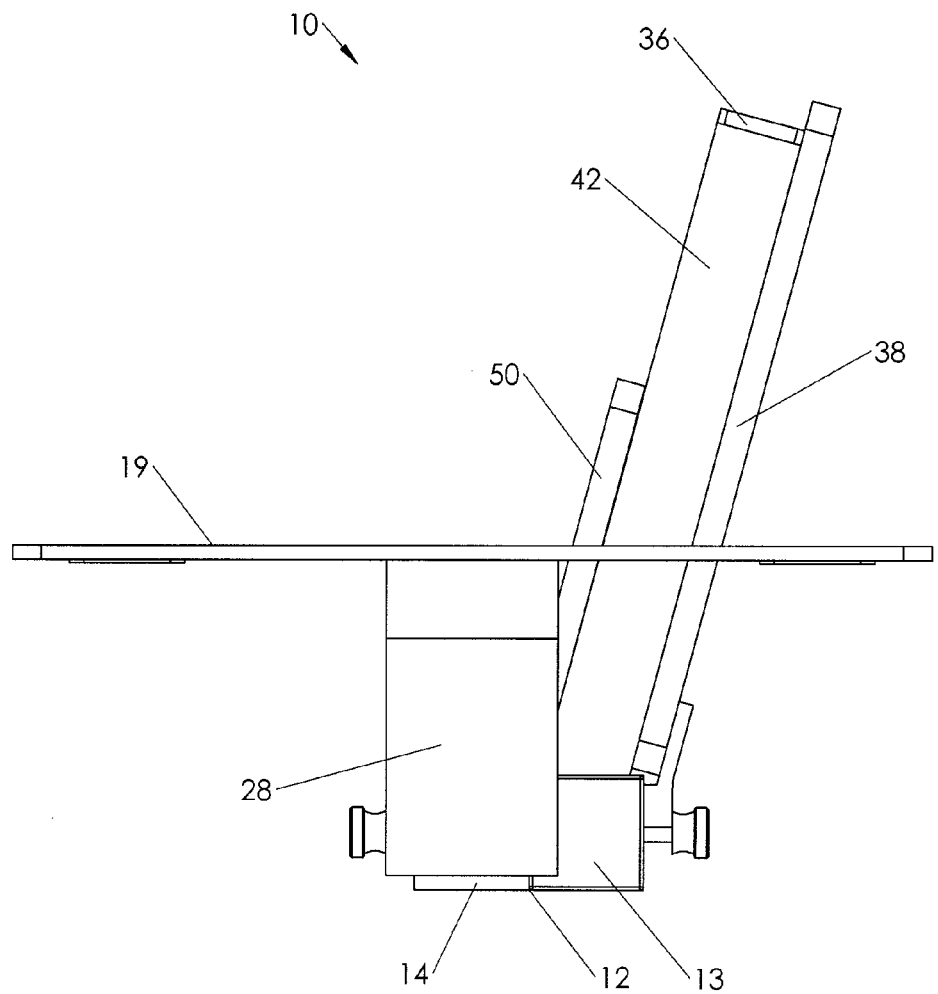
FIG. 7 is a first side elevation view taken at one end of the apparatus of FIG. 1.
Figure 8:
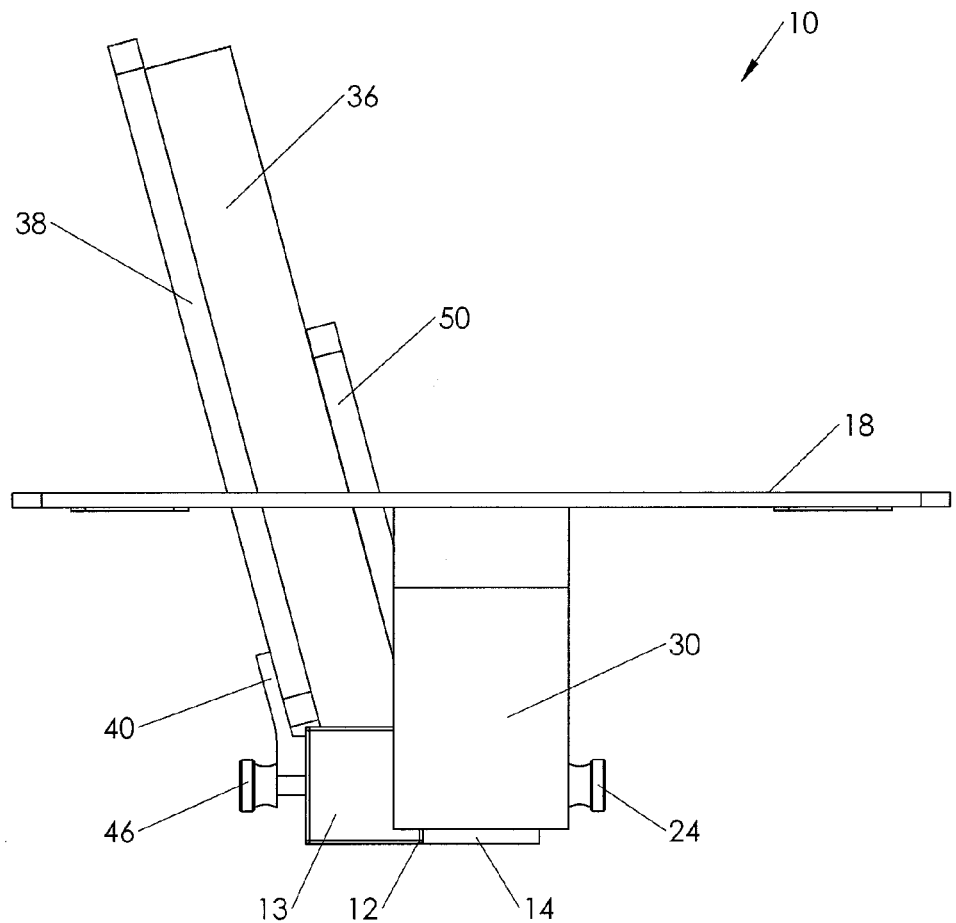
FIG. 8 is a second side elevation view taken at an opposite end of the apparatus of FIG. 1.

The apparatus 10 for supporting an electronic device has a primary support member 12 that extends in a longitudinal manner with first and second ends. In the exemplary prototype the primary support member 12 comprises two lengths of side by side by side square aluminum tubing 13, 14 that are fastened to one another by welds. This feature of the prototype is best shown in FIG. 2 where the passage 17 in the first length of hollow aluminum tubing 13 and the passage 16 in the second length of hollow aluminum tube 14 are visible. In the exemplary prototype the passage 17 in the first length of hollow aluminum tubing 13 is sealed at each end of the primary support member by an end cap 15 to prevent moisture and steam from entering the passage 17. In FIG. 2 the apparatus is shown with the components that mate with the hollow tubing removed to show the structure of the primary support member. A secondary support component 18, 19 is fixed to each end of the primary support member 12. With reference to FIG. 2A in conjunction with FIGS. 1 and 3 in the exemplary prototype each of the secondary support components 18, 19 comprises a bar 20, 21 having external dimensions that are complementary to the internal dimensions of the hollow square tube 14 such that the bar of the secondary support component can be inserted into the passage in the hollow square tube. In this first embodiment both of the secondary support components 18, 19 are movable with respect to the primary support member 12 to adjust the size of the apparatus. The bars 20, 21 of the secondary support components 18, 19 can slide in the passage 16 in the hollow square tube 14 and when the apparatus has a desired length the locations of the bars in the hollow square tube are secured in place using locking mechanisms such as set screws 24, 26. It is understood that the primary support member may be provided with any suitable locking mechanism, for example set screws or pins, to secure the bars of the secondary support components in position. As shown in the exemplary prototype the secondary support components each comprise a bar 20, 21 fixed to a curved hanger member 28, which is in turn connected to an arm 32, 34 such that the arms 32, 34 of the secondary support components are at least substantially parallel to one another. As shown for example in FIG. 9 the secondary support components 18, 19 are configured to mate with an upper surface of a device, here a bath tub 70, for receiving a person wherein the device for receiving a person is provided with a pair of spaced apart at least substantially parallel upper surfaces 73. In this example the upper surfaces of the device are the top rim of the bath tub. Bottom surfaces of the arms 32, 34 of the secondary support components 18, 19 may be provided with slip resistant pads 35 as shown in FIG. 6 which is a bottom view looking up towards the apparatus 10. It is understood that the configuration of the secondary support components can be adapted to be complementary with the configuration of the device for receiving a person chosen to be equipped with an apparatus of the present invention. It is an advantage of the apparatus that an electronic device may positioned by adjusting the secondary support components and locking them in place to allow users of the apparatus to position a viewing screen either directly in front of person or more to one side or the other for use and viewing comfort.

Figure 14:
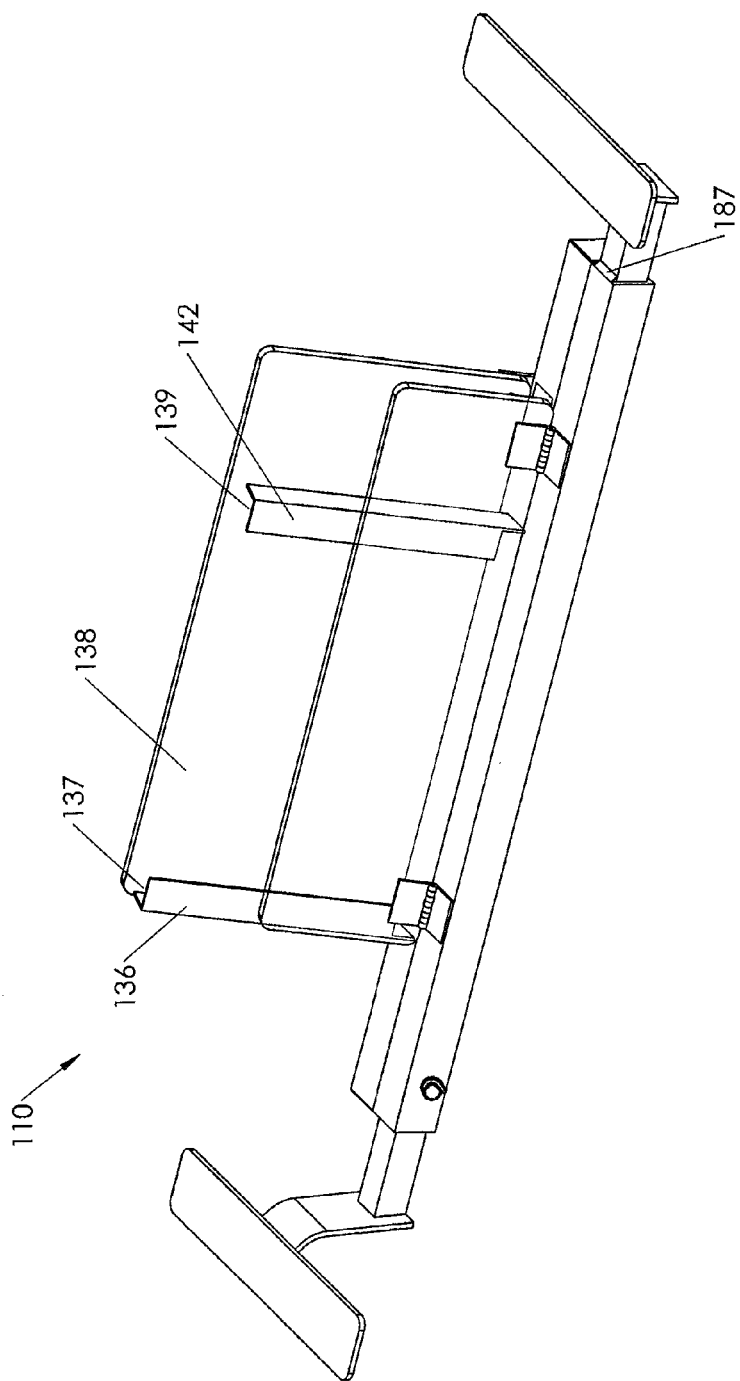
FIG. 14 is a perspective view of an apparatus for supporting an electronic device according to a second embodiment of the present.
Figure 15:
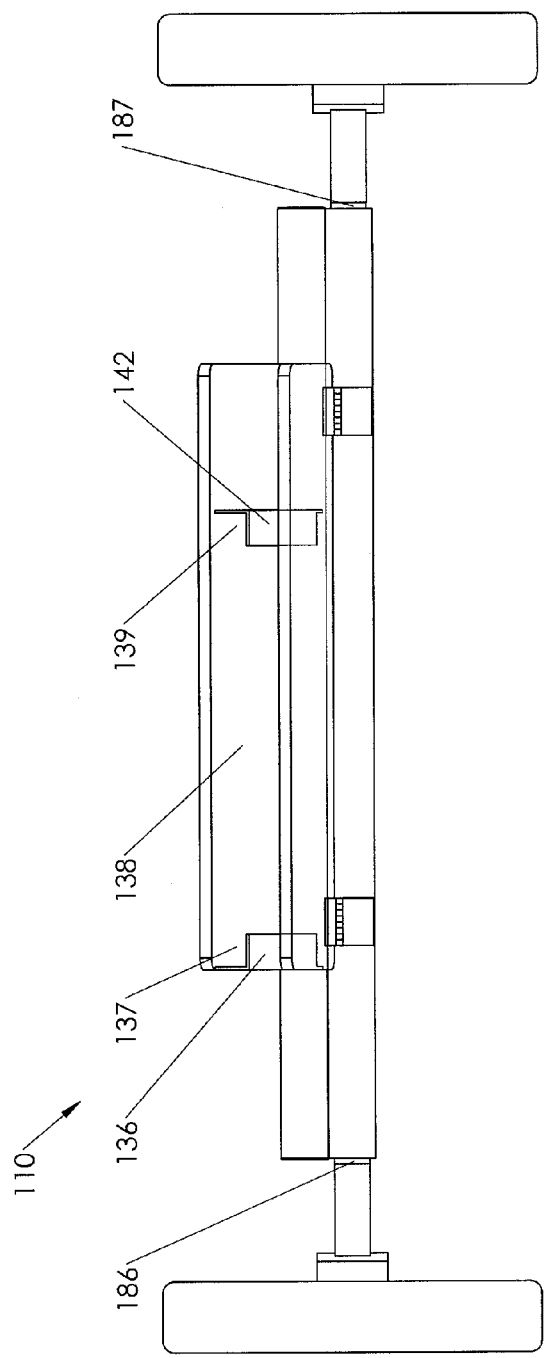
FIG. 15 is a top view looking down on an apparatus for supporting an electronic device according to a third embodiment of the present.

In the embodiment of the apparatus 10 for supporting an electronic device shown in FIGS. 1-8 both of the secondary support components 18, 19 are movable with respect to the primary support member 12 to adjust the size of the apparatus 10 to be complementary to a space between the at least substantially parallel upper surfaces of the device for receiving a person. However it is understood that as shown in FIG. 14 an apparatus 110 for supporting an electronic device may have one of the secondary support components fixed to the primary support member in a permanent, that is to say non movable location for example by a weld 187. In such a configuration only one of the secondary support components is movable with respect to the primary support member to adjust the size of the apparatus. Further it is understood that as shown in FIG. 15 an apparatus 110 for supporting an electronic device may have both of the secondary support components fixed to the primary support member in a permanent, that is to say non movable location for example by a welds 186, 187. In such a configuration neither of the secondary support components is movable with respect to the primary support member and the size of the apparatus cannot be adjusted. The configuration of an apparatus for supporting an electronic device with regards to adjustability of the size of the apparatus may be selected with consideration to such factors as the chosen method of manufacturing components of the apparatus, the environment in which the apparatus will be used, the mental and physical condition of a person intended to use the apparatus, and if a device upon which the apparatus is intended to be mounted has standard dimensions such as the width of a hospital bed provided with side rails.

An assembly for receiving and supporting the electronic device is mounted on the primary support member 12. The assembly for receiving and supporting the electronic device includes a back panel 38 extending upwardly from and fixed to the primary support member 12. The back panel is fixed to the primary support member by a brace 40 and an appropriate fastener 49 such as a screw as shown in FIG. 2. The back panel may comprise any suitable material which is preferably at least water resistant to protect an electronic device from moisture. While the back panel may be transparent that is not essential to the function of the apparatus. A pair of at least substantially parallel side supports 36, 42 are fixed directly or indirectly to and extend upwardly from the primary support member 12. As shown in FIG. 2 the back panel 38 is fixed to one of the side supports 36 by suitable fasteners 47. Each of the side supports defines at least in part a channel 37, 39 that faces and is parallel to the channel defined at least in part by the other side support as shown in FIG. 1 for receiving an electronic device with a side of the electronic device resting on the primary support member as shown for example in FIG. 9. In the exemplary prototype the side supports were made of aluminum channel stock that provides by itself channels for receiving an electronic device with a side of the electronic device resting on the primary support member. The side supports 36, 42 should extend upwardly from the primary support member at the same inclination as the back panel with the side supports adjacent to the back panel to at least restrict the passage of steam or liquid towards an electronic device via a gap between the back panel and the side support. For example in the exemplary prototype the rear panel and the side supports are oriented at a fifteen degree rear slope for balance and ease of electronic device screen viewing. With reference to FIGS. 14 and 15 an apparatus 110 according to the present invention may have a back panel 138 made of molded plastic with one or both of the side supports 136, 142 molded integral to the back panel the side supports having an "L" shape instead of the "U shape shown in FIGS. 1-8. In the embodiment of FIGS. 14 and 15 at least one of the side supports only in part defines a channel 137, 139 for receiving an electronic device. In this embodiment the back panel 138 in part defines a channel for receiving an electronic device. In this embodiment a channel for receiving an electronic device is defined by the back panel and the side support acting together to define a channel for receiving an electronic device.

Figure 9:
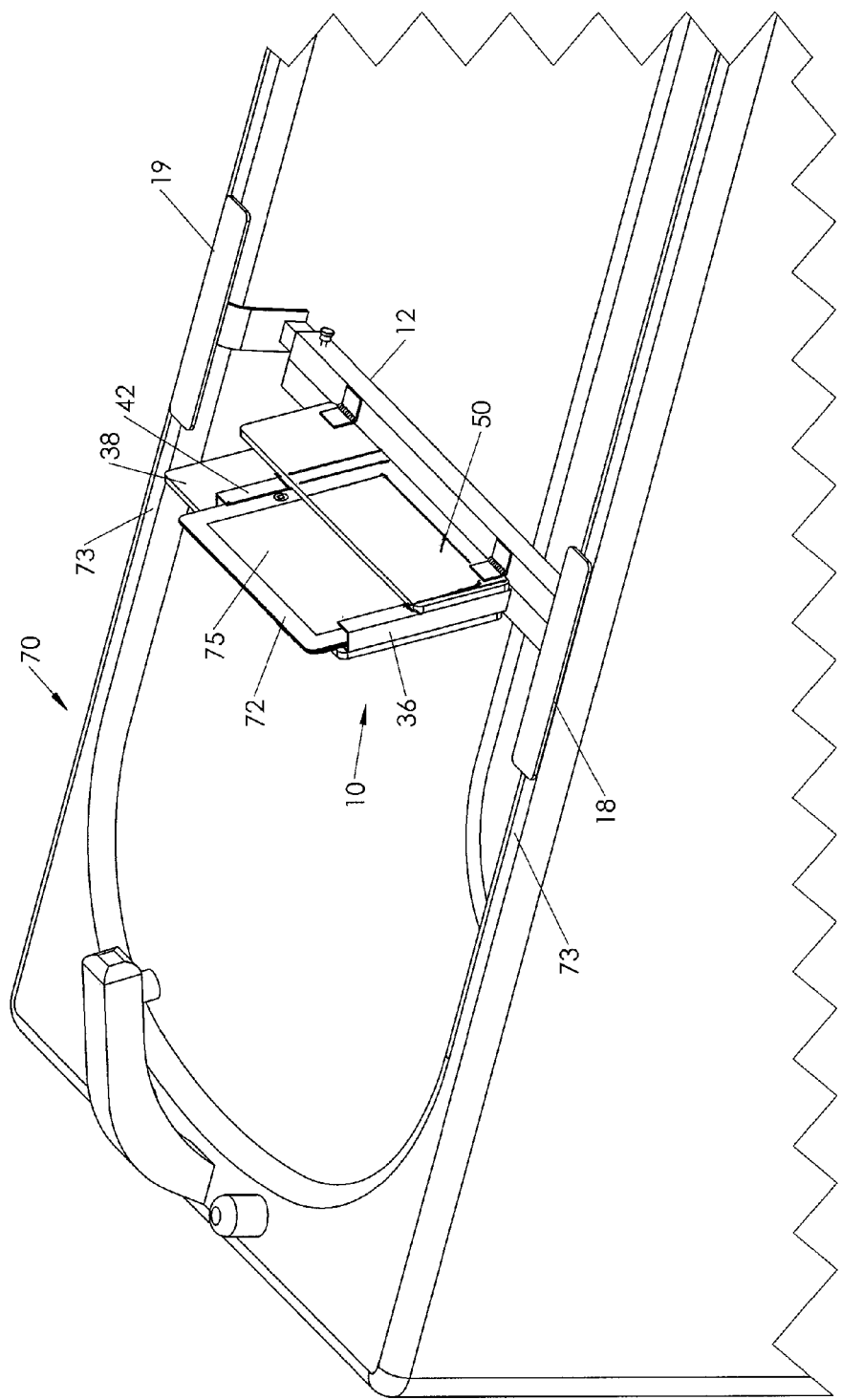
FIG. 9 is a front perspective view of the apparatus of FIG. 1 resting on a bath tub while supporting an electronic device.
Figure 10:
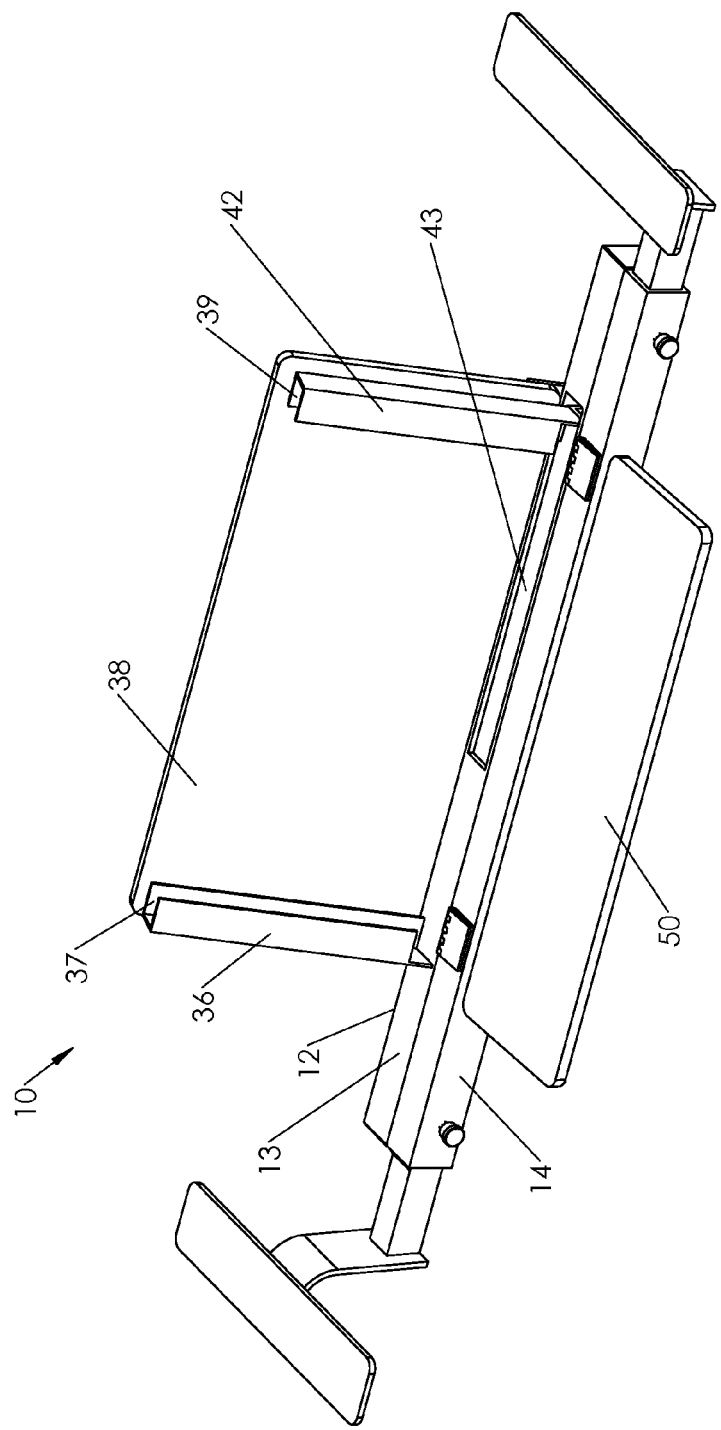
FIG. 10 is a front perspective view of the apparatus of FIG. 1 with the transparent panel swiveled downward.
Figure 11:
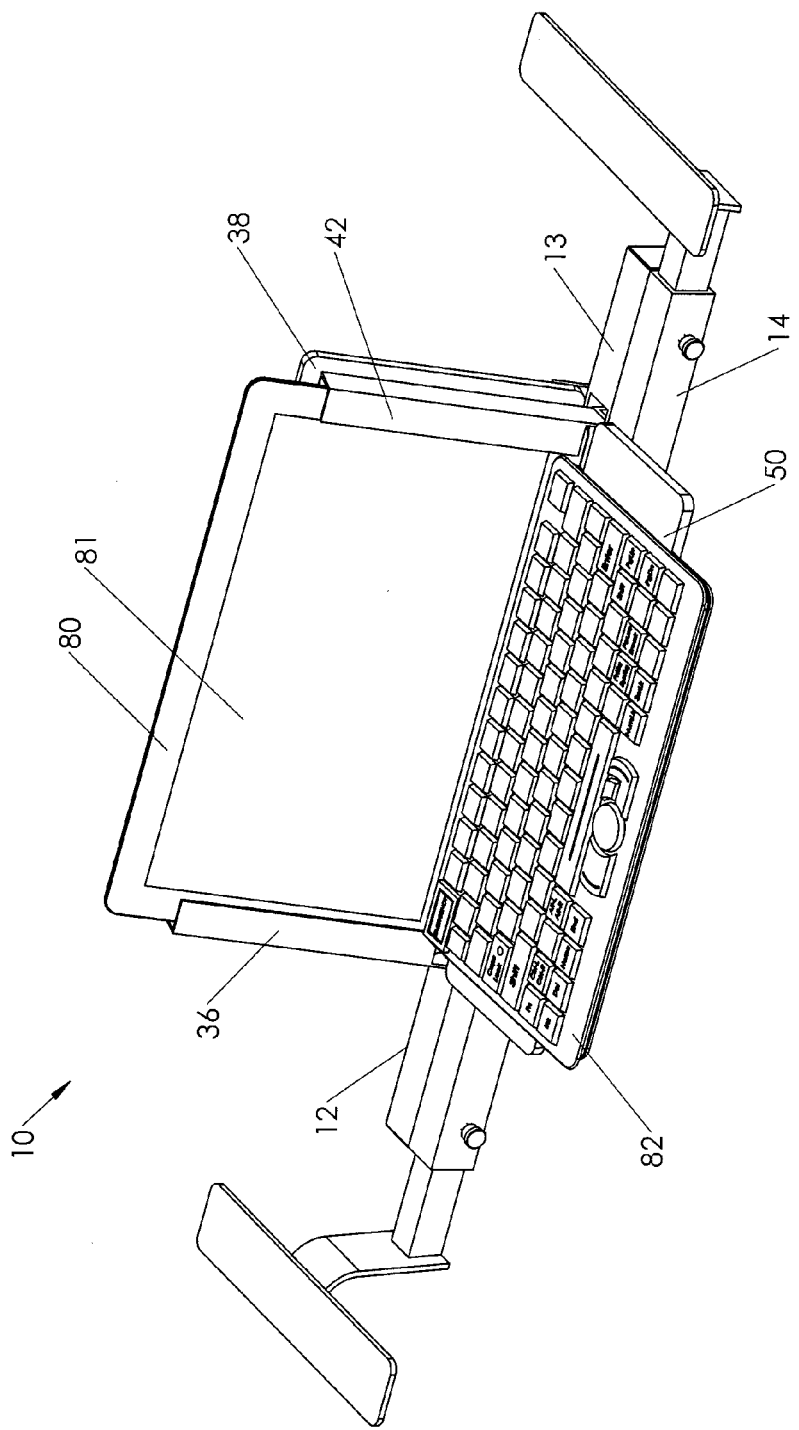
FIG. 11 is a front perspective view of the apparatus of FIG. 1 supporting an electronic with the keyboard support swiveled downward and supporting a keyboard.

A transparent panel 50 extends upwardly from and is fixed to the primary support member 12. The transparent panel 50 is disposed with the side supports 36, 42 located between the transparent panel 50 and the back panel 38. The transparent panel 50 extends upwardly from the primary support member 12 a distance that is less than a distance that the back panel 38 extends upwardly from the primary support member. As shown for example in FIG. 3, there is a gap G between an uppermost edge of the transparent panel 50 and an uppermost edge of the back panel 38. Referring again to FIG. 9 an electronic device 72 such as an e-reader or a tablet computer is shown supported and protected by the apparatus 10 of the present invention. The electronic device is shown in the channels provided at least in part by the side supports 37, 42 with a side of the electronic device resting on the primary support member 12. The transparent panel 50 extends upwardly to protect only a lower portion of the touch screen 75 of the electronic device. If for example a person is viewing pages of an e-book on the touch screen of the electronic device the person can touch the upper portion of the touch screen 75 to scroll forward or backwards to other pages of the document being read. An ergonomic study may be conducted to determine an optimal size of the gap between an uppermost edge of the transparent panel 50 and an uppermost edge of the back panel 38. The transparent panel may be made of any suitable transparent material including polymers such as Plexiglass® or even a tempered glass. Preferably the transparent panel 50 is fixed to the primary support member 12 by one or more hinges 54, 55. The transparent panel 50 is pivotable about the at least one hinge 54, 55 between a first orientation where the transparent panel extends upwardly from the primary support member to shield at least a portion of a display screen of an electronic device supported by the side supports and the primary support member as shown in FIG. 9, and a second orientation where the transparent panel is oriented at least substantially horizontal as shown in FIGS. 10 and 11 to allow access to the entire screen of an electronic device and to support a keyboard 82 of an electronic device 80 such as a small laptop computer. It is to be noted that when the transparent panel 50 is pivoted to a substantially vertical orientation that the screen 81 of the electronic device is not protected by the transparent panel but the electronic device continue to be supported and secured by the side supports and the primary support member.

Figure 2B:
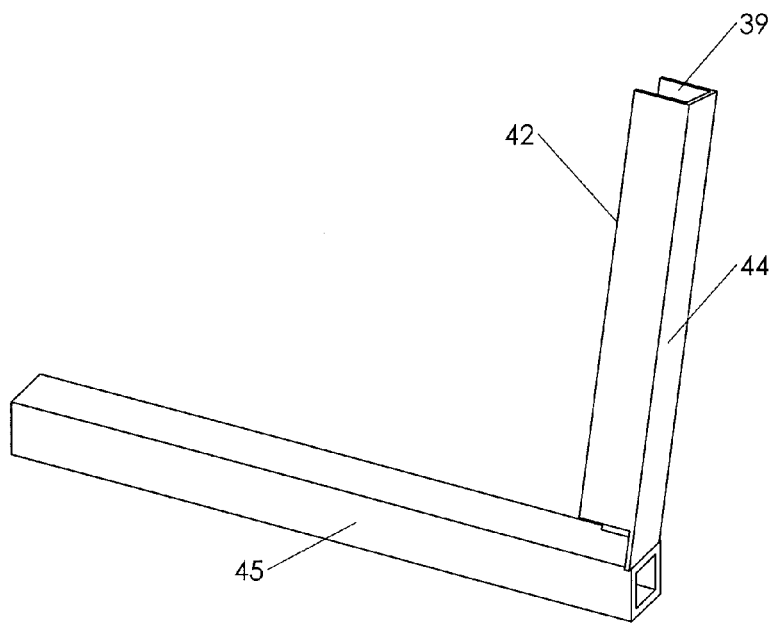
FIG. 2B shows the slidable upright support assembly removed from the apparatus.
Figure 3:
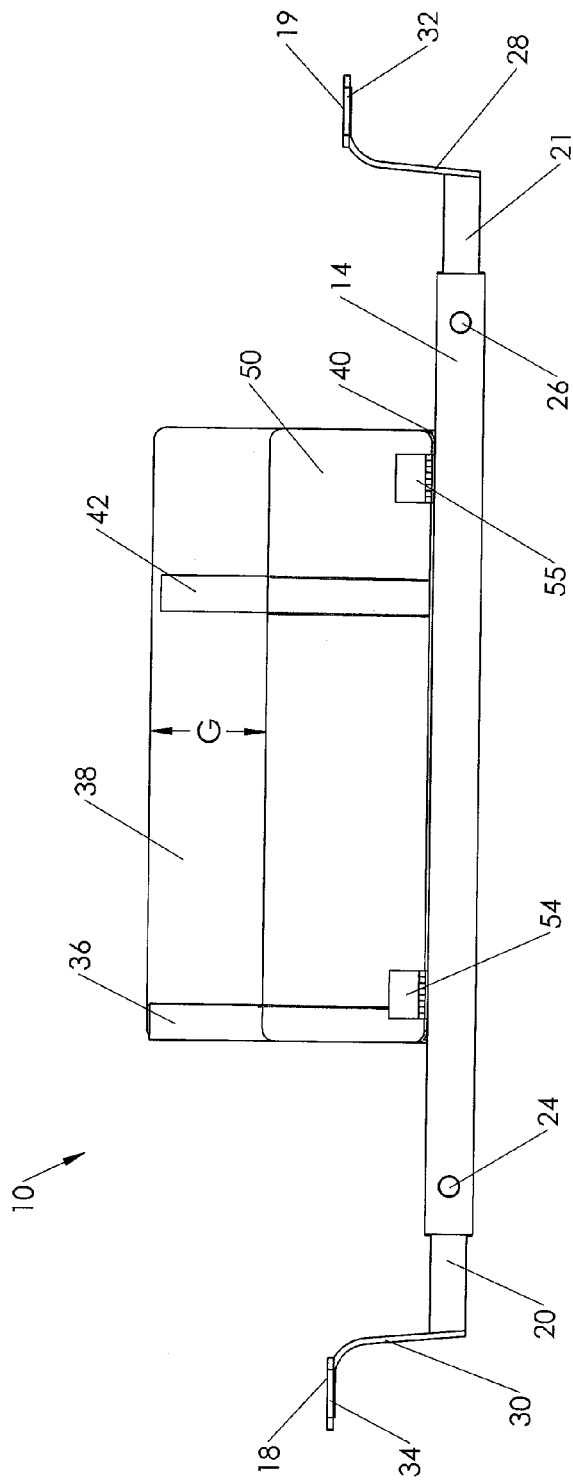
FIG. 3 is a front view of the apparatus of FIG. 1.
Figure 4:
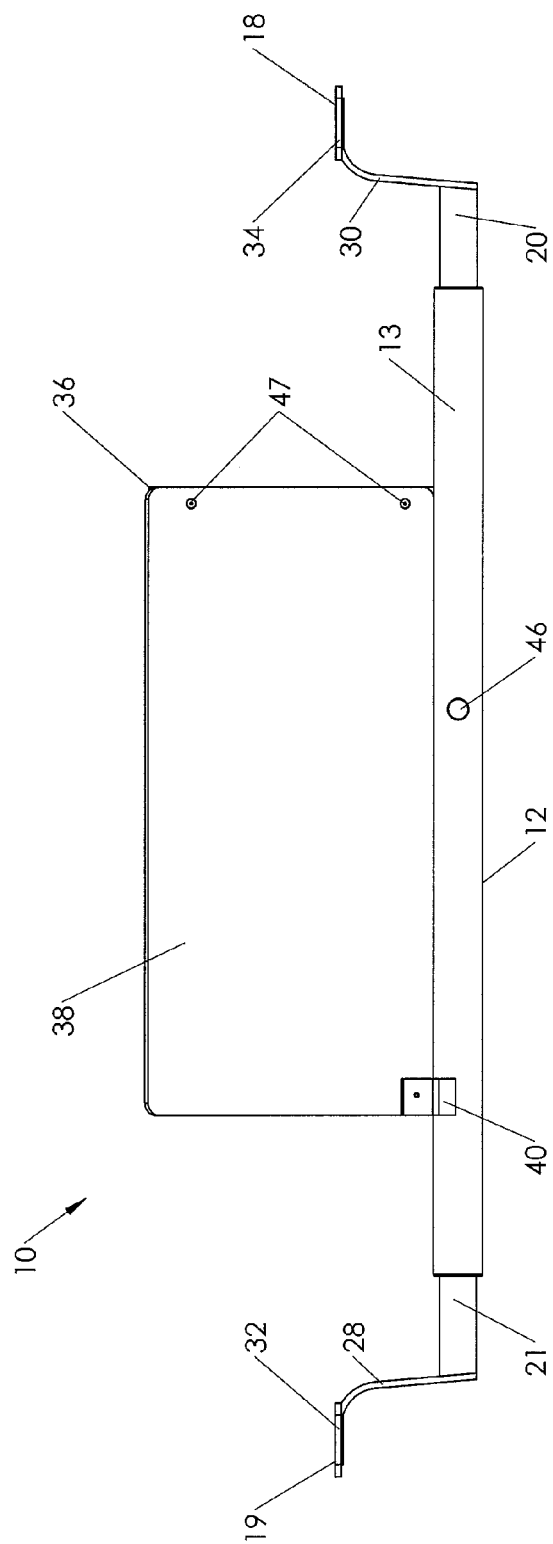
FIG. 4 is a rear view of the apparatus of FIG. 1.
Figure 5:
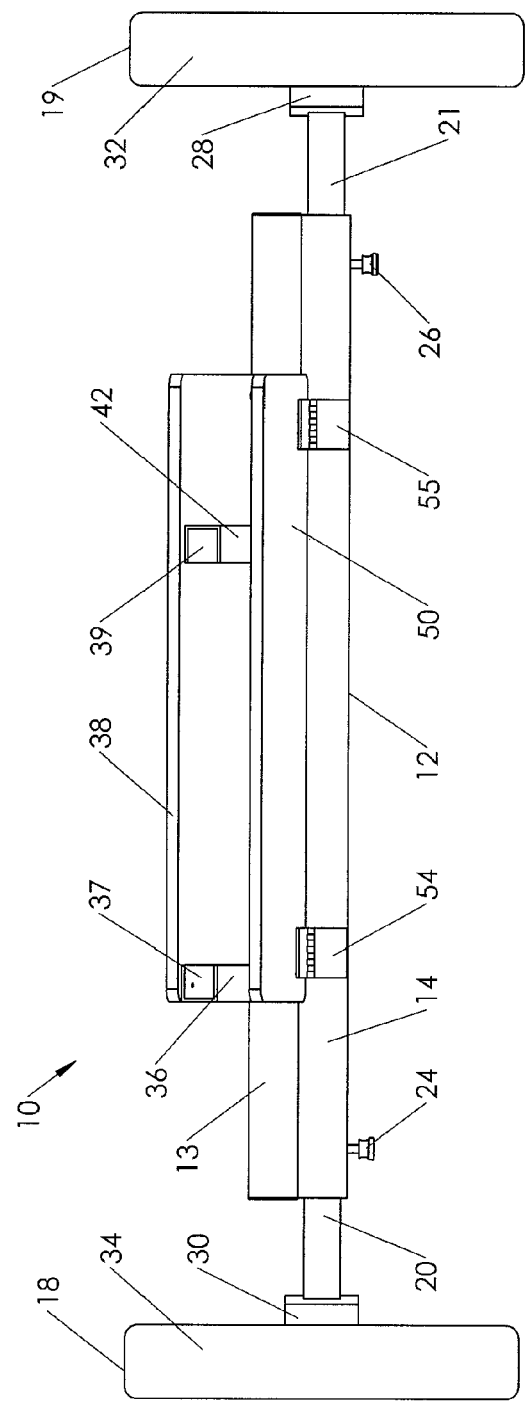
FIG. 5 is a top view looking down on the apparatus of FIG. 1.

The side supports 36, 42 may both be attached to the primary support member 12 in a stationary manner if the apparatus 10 is intended for use with only one specific electronic device. However, it is preferable that at least one of the side supports 42 is movable in a sliding manner in a slot 43, shown in FIGS. 1 and 10, in the primary support member 12 with respect to the primary support member 12 to accommodate electronic devices of various sizes. FIG. 2B shows a movable side support 42 that has been removed from the apparatus. In the exemplary prototype to facilitate movement of the side support member 42 at least a portion of an interior space of the primary support member is a hollow tube. The primary support member has a channel in an upper surface of the primary support member, the channel being contiguous with at least a portion the hollow portion of the primary support member. A portion 45 of the movable side support 42 is disposed in the passage in the primary support member with the upwardly extending portion 44 of the movable side support member protruding through the channel in the top of the primary support member and the movable side support member 42 whereby the movable side support may be slid along the primary support member to adjust a distance between the side support members. The primary supporting member 12 is provided with a locking mechanism such as a set screw 46 for locking the portion of the movable side support in place. The utility of having at least one of the side support members movable is demonstrated by referring first to FIG. 9 where the side support members 36, 42 are spaced apart a first distance to accommodate a narrower electronic device such as a cell phone or an e-reader of a small tablet computer, then referring to FIG. 11 where the side support members 36, 42 are spaced apart a second distance to accommodate a wider electronic device such as a small laptop computer 80 with a larger display screen.

Figure 12:
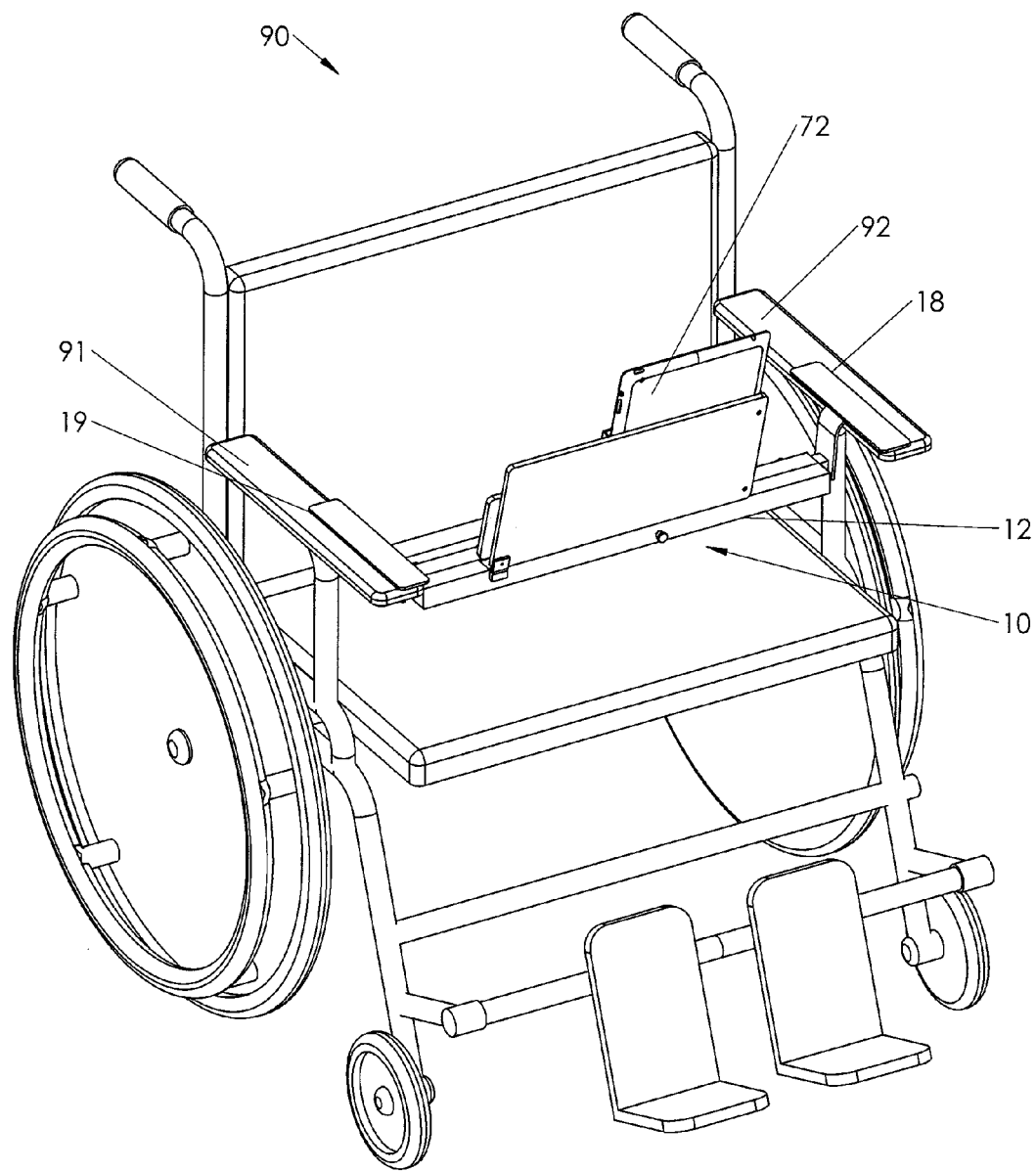
FIG. 12 is a perspective view of the apparatus of FIG. 1 supported on the arms of a wheelchair.
Figure 13:
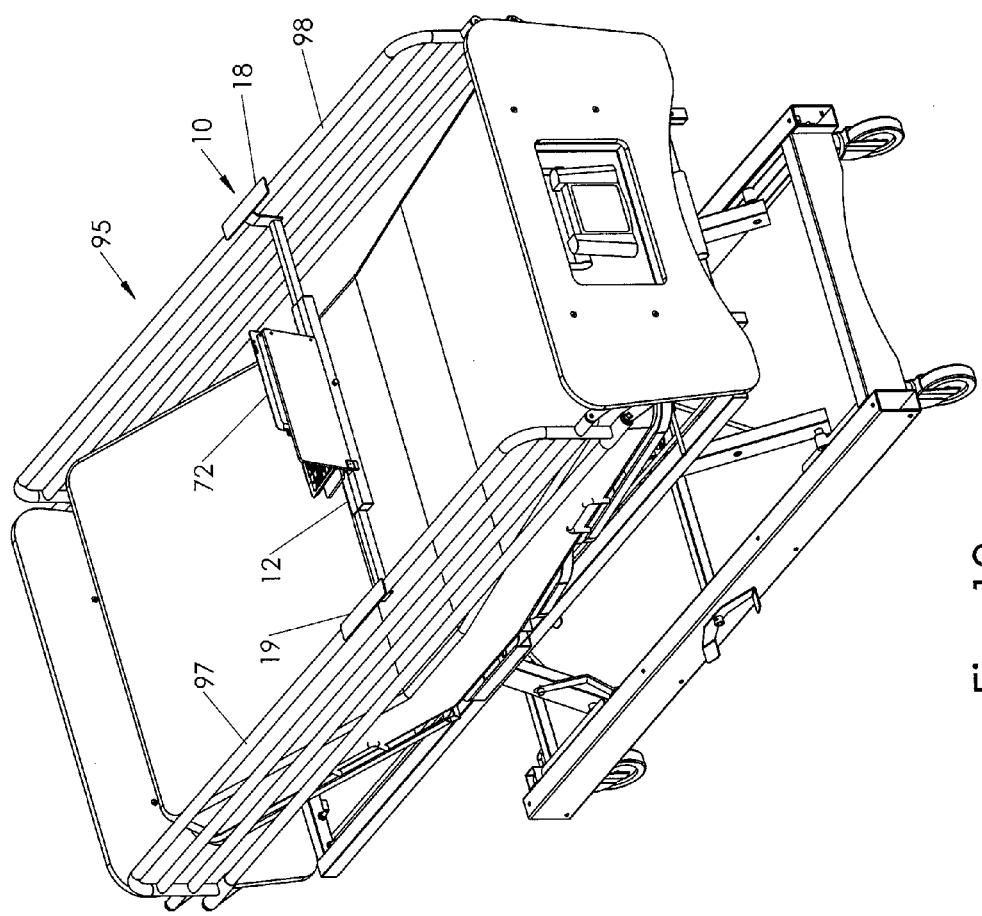
FIG. 13 is a perspective view of the apparatus of FIG. 1 supported on the side rails of a hospital bed.

FIG. 9 is a front perspective view of the apparatus 10 of the present invention resting on the top surfaces 73 of a bath tub 70 while supporting an electronic device 72. FIG. 12 is a perspective view of the apparatus 10 of the apparatus of the present invention supported on the top surfaces of the arms 91, 92 of a wheelchair 90 while supporting an electronic device 72. FIG. 13 is a perspective view of the apparatus 10 of the apparatus of the present invention supported on the side rails 97, 98 of a hospital bed 95 while supporting an electronic device 72. In each instance the secondary support component 18, 19 is configured to mate with an upper surface of a device 70, 90, 95 for receiving a person wherein the device for receiving a person is provided with a pair of spaced apart at least substantially parallel upper surfaces 73; 91, 92; 97, 98.

The apparatus of the present invention provides a steam, water splash and fog resistant housing for electronic devices that protects the screen, side and bottom ports, jacks or connective entrances for most types of devices. The apparatus of the present invention securely supports electronic computer devices for individuals, or persons with mental and or physical limitations who could benefit by using the apparatus for holding an electronic device in either; a bath tub, whirlpool, wheel chair, hospital bed or other settings for personal enjoyment of electronic devices with touch screens, voice activation or keyboards with or without built in "mouse" control pads. The apparatus of the present invention has a unit design that allows a user to easily insert and remove electronic devices down and into the side support channels in one simple motion for use and security.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. An apparatus for supporting an electronic device, the apparatus comprising:
   a primary support member having first and second ends; each end of the primary support member being fixed to a secondary support component that is configured to mate with an upper surface of a device for receiving a person wherein the device for receiving a person is provided with a pair of spaced apart at least substantially parallel upper surfaces;
   an assembly for receiving the electronic device is mounted on the primary support member, the assembly comprising a back panel extending upwardly from and fixed to the primary support member;
   a pair of at least substantially parallel side supports fixed directly or indirectly to and extending upwardly from the primary support member, each of the side supports defining at least in part a channel that faces and is parallel to the channel defined at least in part by the other side support for receiving an electronic device with a side of the electronic device resting on the primary support member; and
   a transparent panel extending upwardly from and fixed to the primary support member by one or more hinges, the transparent panel extending upwardly from the primary support member a distance that is less than a distance that the back panel extends upwardly from the primary support member, the transparent panel being disposed with the side supports located between the transparent panel and the back panel, and wherein the transparent panel is pivotable about the at least one hinge between a first orientation where the transparent panel extends upwardly from the primary support member to shield at least a portion of a display screen of the electronic device supported by the side supports and the primary support member, and a second orientation where the transparent panel is oriented at least substantially horizontal for supporting an auxiliary object of the electronic device.

2. The apparatus for supporting an electronic device according to claim 1 wherein at least one of the secondary support components is movable with respect to the primary support member to adjust the size of the apparatus to be complementary to a space between the at least substantially parallel upper surfaces of the device for receiving a person.

3. The apparatus for supporting an electronic device according to claim 1 wherein both of the secondary support components are movable with respect to the primary support member to adjust the size of the apparatus to be complementary to a space between the at least substantially parallel upper surfaces of the device for receiving a person.

4. The apparatus for supporting an electronic device according to claim 1 wherein at least one of the side supports is movable with respect to the primary support member to accommodate electronic devices of various sizes.

5. The apparatus for supporting an electronic device according to claim 1 wherein each of the side supports defines a channel that faces and is parallel to the channel defined by the other side support.

6. An apparatus for supporting an electronic device, the apparatus comprising:
    a primary support assembly comprising a primary support member having first and second ends and a pair of secondary support components with one of the secondary support components attached to each end of the primary support member and at least one of the secondary support components is movable with respect to the primary support member to adjust an overall length of the primary support assembly, each of the secondary support components being configured to mate with an upper surface of a device for receiving a person wherein the device for receiving a person is provided with a pair of spaced apart at least substantially parallel upper surfaces; and
    an assembly for receiving an electronic device is mounted on the primary support member, the assembly for receiving an electronic device comprising:
    a back panel extending upwardly from and fixed to the primary support member,
    a pair of at least substantially parallel side supports fixed to and extending upwardly from the primary support member, each of the side supports defining at least in part a channel that is open towards the channel defined at least in part by the other side support for receiving an electronic device when a side of the electronic device is resting on the primary support member, at least one of the side supports being movable with respect to the primary support member to accommodate electronic devices of various sizes, and
    a transparent panel extending upwardly from and fixed to the primary support member by at least one hinge, the transparent panel extending upwardly from the primary support member a distance that is less than a distance that the back panel extends upwardly from the primary support member, the transparent panel being disposed with the side supports located between the transparent panel and the back panel, and wherein the transparent panel is pivotable about the at least one hinge between a first orientation where the transparent panel extends upwardly form the primary support member to shield at least a portion of a display screen of the electronic device supported by the side supports and the primary support member, and a second orientation where the transparent panel is oriented at least substantially horizontal for supporting an auxiliary object of the electronic device.

7. The apparatus for supporting an electronic device according to claim 6 wherein each of the side supports defines a channel that faces and is parallel to the channel defined by the other side support.

8. The apparatus for supporting an electronic device according to claim 6 wherein at least a portion of an interior space of the primary support member is a hollow tube with a portion of the secondary support component that is movable being located inside the hollow tube and is slidable to adjust the overall length of the primary support assembly.

9. The apparatus for supporting an electronic device according to claim 8 wherein the primary supporting member is provided with a locking mechanism for locking the portion of the secondary support component located inside the hollow tube in place.

10. The apparatus for supporting an electronic device according to claim 6 wherein both of the secondary support components are movable with respect to the primary support member to adjust the overall length of the primary support assembly.

11. The apparatus for supporting an electronic device according to claim 10 wherein at least a portion of an interior space of the primary support member is a hollow tube and a portion of each of the secondary support components is located inside the hollow tube and is slidable to adjust the overall length of the primary support assembly.

12. The apparatus for supporting an electronic device according to claim 11 wherein the primary supporting member is provided with locking mechanisms for locking the portions of the secondary support components located inside the hollow tube in place.

13. The apparatus for supporting an electronic device according to claim 6 wherein a portion of the movable side support is disposed in a passage in the primary support member whereby the movable side support may be slid along the primary support member to adjust a distance between the side support members.

14. The apparatus for supporting an electronic device according to claim 13 wherein the primary supporting member is provided with a locking mechanism for locking the portion of the movable side support in place.

15. An apparatus for supporting an electronic device, the apparatus comprising:
    a primary support assembly comprising a primary support member having first and second ends and a pair of secondary support components with one of the secondary support components attached to each end of the primary support member and each of the secondary support components is movable with respect to the primary support member to adjust an overall length of the primary support assembly, each of the secondary support components being configured to mate with an upper surface of a device for receiving a person wherein the device for receiving a person is provided with a pair of spaced apart at least substantially parallel upper surfaces; and
    an assembly for receiving an electronic device is mounted on the primary support member, the assembly for receiving an electronic device comprising:
    a back panel extending upwardly from and fixed to the primary support member,
    a pair of at least substantially parallel side supports fixed to and extending upwardly from the primary support member, wherein each of the side supports defines a channel that faces and is parallel to the channel defined by the other side support for receiving an electronic device when a side of the electronic device is resting on the primary support member, at least one of the side supports being movable with respect to the primary support member to accommodate electronic devices of various sizes, and a transparent panel extending upwardly from and fixed to the primary support member by at least one hinge, the transparent panel being disposed with the side supports located between the transparent panel and the back panel, the transparent panel extending upwardly from the primary support member a distance that is less than a distance that the back panel extends upwardly from the primary support member with a gap between an uppermost edge of the transparent panel and an uppermost edge of the back panel, and the transparent panel is pivotable about the at least one hinge between a first orientation where the transparent panel extends upwardly from the primary support member to shield at least a portion of a display screen of an electronic device supported by the side supports and the primary support member, and a second orientation where the transparent panel is oriented at least substantially horizontal for supporting an auxiliary object of the electronic device.

16. The apparatus for supporting an electronic device according to claim 15 wherein at least a portion of an interior space of the primary support member is a hollow tube that communicates with both ends of the primary support member and a portion of each of the secondary support components is located inside the hollow tube and is slidable to adjust the overall length of the primary support assembly, and the primary supporting member is provided with locking mechanisms for locking the portions of the secondary support components located inside the hollow tube in place.

17. The apparatus for supporting an electronic device according to claim 15 wherein a portion of the movable side support is disposed in a passage in the primary support member with a channel in the primary support member being contiguous with a hollow portion of the primary support member whereby the movable side support may be slid along the primary support member to adjust a distance between the side support members, and the primary supporting member is provided with a locking mechanism for locking the portion of the movable side support in place.

18. The apparatus for supporting an electronic device according to claim 15 wherein the device for receiving a person is a bath tub, a bed provided with side rails or a chair provided with arms.

* * * * *